(No Model.)
J. CLASS.
REMOVABLE SAW TOOTH.
No. 369,919. Patented Sept. 13, 1887.
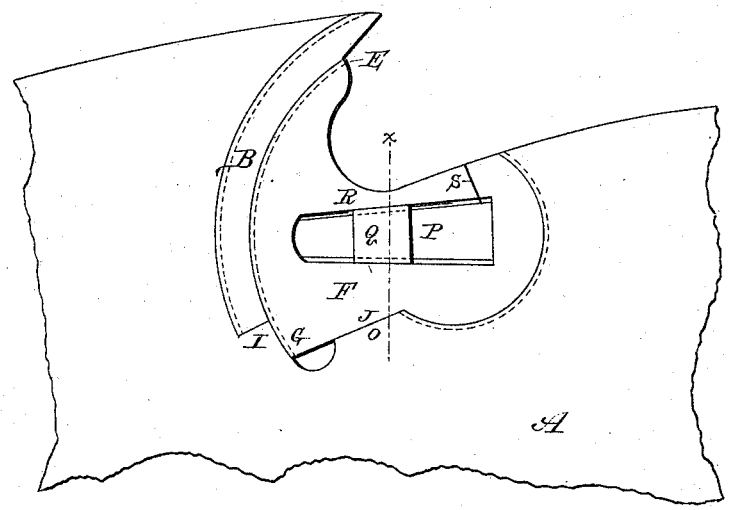
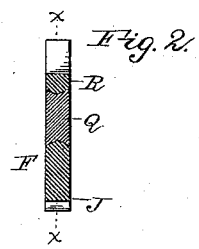
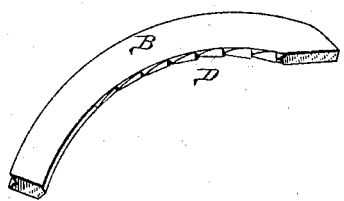
WITNESSES
INVENTOR
Jno. Class,
per J. A. Lehmann,
Attorney

UNITED STATES PATENT OFFICE.

JOHN CLASS, OF CANTON, OHIO.

REMOVABLE SAW-TOOTH.

SPECIFICATION forming part of Letters Patent No. 369,919, dated September 13, 1887.

Application filed November 28, 1884. Renewed January 24, 1887. Serial No. 225,712. (No model.)

*To all whom it may concern:*

Be it known that I, JOHN CLASS, of Canton, in the county of Stark and State of Ohio, have invented a certain new and useful Improvement in Removable Saw-Teeth; and I do hereby declare the following to be a full, clear, and exact description of the invention, such as will enable others skilled in the art to which it pertains to make and use it, reference being had to the accompanying drawings, which form part of this specification.

My invention relates to an improvement in removable saw-teeth; and it consists in the combination of the saw, a removable saw-tooth provided with serrations or ratchets on its inner edge, and a locking-plate which is provided with slots extending at an angle to each other, as will be more fully described hereinafter.

Figure 1 is a side elevation of a device embodying my invention. Fig. 2 is a vertical cross-section taken through the wedge and the locking-plate. Fig. 3 is a side view of the removable tooth detached from the saw.

A represents a circular saw which has an opening cut in its edge for each tooth, as here shown. The removable tooth B is made upon a perfect curve and has formed upon its outer side a V-shaped groove to catch over a correspondingly-shaped edge upon the saw, for the purpose of holding the tooth in position against any lateral displacement. When the tooth is forced inward to its full extent, its lower end rests solidly upon the shoulder I, which is made in the saw so as to form an abutment or bearing, which will render the tooth as firm as though made integral with the saw itself. Upon the inner edge of each tooth are made a series of ratchets, D, with which the point E of the locking-plate F is made to engage one at a time as the tooth becomes worn away, and is then fed forward. The outer edge of the locking-plate F has a V-shaped groove made in it, and the inner edge of the tooth is correspondingly shaped, so as to catch in this groove, and thus be held firmly in place. As each tooth becomes worn away, the locking-plate is drawn outward far enough to allow the tooth to be moved forward, and then the two parts are forced back into position. The toe or point of the locking-plate then supports the tooth in position so firmly and solidly that the tooth can be swaged without having to remove it from the saw. By thus providing the teeth with ratchets and adapting them to be fed forward as rapidly as they become worn away each tooth can be used until but a very short piece remains, and the tooth will be as effective after a considerable portion has been worn away as when the tooth is of full length. By this construction it also becomes unnecessary to place wedges under the ends of the teeth as they become worn away for the purpose of supporting the teeth in position.

In order to support the locking plate or device solidly in position its heel or lower point G is made to catch over the inner side of the shoulder I, against which the lower end of the tooth rests, and as this heel has in its outer edge a V-shaped groove, and as the side of the shoulder is correspondingly shaped, the plate is locked in position so that it cannot spring or become displaced while the saw is in use. In order to give this locking-plate a solid bearing, so that it can support the removable tooth with sufficient firmness to allow the tooth to be swaged without being removed from position, the lower edge, J, of the locking-plate is made upon a straight line and rests solidly upon the shoulder O, which is formed in the saw. This shoulder being of a considerable length, the locking-plate is supported rigidly in position under all circumstances. While the tooth is fed forward from time to time as it becomes worn away, the lower edge of the locking-plate always rests solidly upon this shoulder O, so as to allow the locking-plate as little movement or vibration as possible.

In order to enable the toe or upper point of the locking-plate to be forced outward against the inner side of the tooth with any desired degree of force, a slot, P, is formed in the locking-plate, which slot is largest at its outer edge, so as to allow the wedge Q to be inserted, as shown. The edges of this slot are made V-shaped, and in the edges of the wedge are made corresponding V-shaped grooves, so as to hold the wedge securely in position. When it is desired to force outward the heel or toe of the locking-plate, the wedge is forced toward the small end of the groove, and this movement of the wedge springs the part R just above it, and the point or toe of the locking-plate is then forced outward, so as to engage with greater power with the ratchets. The wedges need not be used unless it is desired. I find that a saw can be used entirely without them. A slot, S, is cut on an angle or an incline through the tube edge of the locking-plate in the slot P, so that when the wedge is driven up it will spread a locking-plate more than it would do without the slot. Where this slot S is not used the action of the wedge has a tendency to draw the bow of the locking-plate over against the tooth, leaving a driven space or opening; but where this slot S is used the locking-plate is spread, so that it will bear both against the saw-tooth and that portion of the saw which surrounds the inner end of the locking-plate.

Having thus described my invention, I claim—

1. The combination of the saw A, provided with the shoulder I, and the bearing O, with the removable saw-tooth having ratchets or serrations D in its inner edge, the plate F, having its point E adapted to engage with the ratchets or serrations D, and having the slots P S, which extend at an angle to each other, substantially as shown and described.

2. The combination of the saw, the removable saw-tooth, and the locking-plate F, having the slot P, and the slot S, extending from the slot P through the edge of plate, so as to allow the point E of the plate a greater movement, substantially as shown.

In testimony whereof I affix my signature in presence of two witnesses.

JOHN CLASS.

Witnesses:
ED. B. BACH,
DANIEL YANT.